United States Patent
Zhou et al.

(10) Patent No.: US 12,202,097 B2
(45) Date of Patent: Jan. 21, 2025

(54) SYSTEMS AND METHODS FOR AN AUTOMATIC SAFETY PROTOCOL IN ELECTRICAL TOOLS

(71) Applicant: Hilti Aktiengesellschaft, Schaan (LI)

(72) Inventors: Xi Zhou, Kaufering (DE); Christian Koschel, Augsburg (DE); Markus Looser, Landsberg (DE); Olaf Schadoffsky, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 578 days.

(21) Appl. No.: 16/756,375

(22) PCT Filed: Nov. 21, 2018

(86) PCT No.: PCT/EP2018/082066
§ 371 (c)(1),
(2) Date: Apr. 15, 2020

(87) PCT Pub. No.: WO2019/110303
PCT Pub. Date: Jun. 13, 2019

(65) Prior Publication Data
US 2021/0187697 A1 Jun. 24, 2021

(30) Foreign Application Priority Data
Dec. 6, 2017 (EP) .................................... 17205622

(51) Int. Cl.
*G02B 9/02* (2006.01)
*B24B 23/02* (2006.01)
*B24B 55/00* (2006.01)
*B25F 5/02* (2006.01)
*G05B 9/02* (2006.01)

(52) U.S. Cl.
CPC ............ *B24B 55/00* (2013.01); *B24B 23/028* (2013.01); *B25F 5/026* (2013.01); *G05B 9/02* (2013.01)

(58) Field of Classification Search
CPC ....... B24B 55/00; B24B 23/028; B25F 5/026; G05B 9/02
See application file for complete search history.

(56) References Cited

U.S. PATENT DOCUMENTS

| 4,959,906 A | 10/1990 | Moore et al. |
| 5,583,386 A * | 12/1996 | Meixner .................. B25F 5/00 200/600 |
| 5,666,010 A | 9/1997 | Stratiotis et al. |

(Continued)

OTHER PUBLICATIONS

Wenhang Li, Jiayou Wang, Fangming Zhou: Welding robotics and systems; pp. 174 to 177, Dec. 31, 2015, see machine translation.

*Primary Examiner* — Rina I Duda
(74) *Attorney, Agent, or Firm* — Davidson Kappel LLC (57) ABSTRACT

A system includes a power tool and an automatic safety system communicatively coupled to the power tool. The automatic safety system includes one or more sensors disposed about the power tool, where the one or more sensors are configured to gather data about a safety parameter related to an operation of the power tool. The automatic safety system also includes a main detector configured to receive the data gathered by the one or more sensors. The main detector is configured to analyze the received data to determine whether to unlock the power tool for operation.

25 Claims, 5 Drawing Sheets

(56) References Cited

U.S. PATENT DOCUMENTS

| | | | | |
|---|---|---|---|---|
| 6,418,829 B1* | 7/2002 | Pilchowski | B27G 19/02 | 83/477.2 |
| 6,551,525 B2* | 4/2003 | Hofmann | B08B 17/065 | 428/58 |
| 7,373,863 B2* | 5/2008 | O'Banion | B23D 47/08 | 83/72 |
| 7,556,520 B2* | 7/2009 | Minami | F21V 19/0005 | 439/336 |
| 7,628,219 B2* | 12/2009 | Frauhammer | B25F 5/00 | 173/29 |
| 7,658,237 B2* | 2/2010 | Rudolf | B25F 5/00 | 173/2 |
| 8,517,642 B2* | 8/2013 | Borunda | B25B 23/00 | 324/67 |
| 8,857,534 B2* | 10/2014 | Braun | B25F 5/00 | 173/171 |
| 9,114,498 B1* | 8/2015 | Layton, Jr. | B24B 55/00 | |
| 9,144,875 B2* | 9/2015 | Schlesak | B25F 5/024 | |
| 2003/0034164 A1* | 2/2003 | Rudolf | G02B 6/3574 | 173/2 |
| 2005/0069391 A1* | 3/2005 | Dils | G01V 3/15 | 408/16 |
| 2011/0226105 A1* | 9/2011 | Butler | B23D 45/067 | 83/72 |
| 2013/0189901 A1* | 7/2013 | Klee | F16P 5/00 | 451/1 |
| 2014/0245872 A1* | 9/2014 | George | B27B 17/00 | 83/62.1 |
| 2014/0311310 A1* | 10/2014 | Koegel | B27G 19/08 | 83/72 |
| 2017/0008159 A1 | 1/2017 | Boeck et al. | | |

\* cited by examiner

SYSTEMS AND METHODS FOR AN AUTOMATIC SAFETY PROTOCOL IN ELECTRICAL TOOLS

The present disclosure relates generally to the field of electrical tools, and more particularly to a system comprising a power tool and an automatic safety system communicatively coupled to the power tool.

Besides that, the present disclosure also relates to a method for controlling a power tool.

Power tools, such as angle grinders (e.g., side grinder or disc grinder), may be utilized on construction sites.

BACKGROUND

In certain situations, power tools may need additional features to help improve operator safety and efficiency. Indeed, it may be beneficial to have safety features built into the operating function of a power tool, in order to help an operator maintain control over the device even in critical or possible health threatening situations. For example, it may be beneficial to include safety protocols into an angle grinder, that are executed automatically before the angle grinder is engaged for its intended purpose. In particular, such automatic safety features may help an operator of the angle grinder maintain control of the device, thereby improving safety and efficiency during operation.

SUMMARY OF THE INVENTION

Additional or safety features on power tools which are to help improving the operator safety and efficiency are widely known by the prior art. Unfortunately, these prior art safety features on power tools are usually complicated to use or insufficient to guarantee a safe usage of the power tool. Most often it is somehow even possible to bypass or avoid these prior art safety features to operate the power tool. Without the proper employment of all the necessary safety features the usage power tool can be potentially dangerous for the user.

It is an object of the present invention to solve the above described problem and to provide a system comprising a power tool and an automatic safety system communicatively coupled to the power tool with which a safe and uncomplicated usage of a power tool is possible.

In particular, the present invention provides a system comprising a power tool; and an automatic safety system communicatively coupled to the power tool.

According to the invention one or more sensors are disposed about the power tool, wherein the one or more sensors are configured to gather data about a safety parameter related to an operation of the power tool; and a main detector is configured to receive the data gathered by the one or more sensors, wherein the main detector is configured to analyze the received data to determine whether to unlock the power tool for operation. By doing so, the power toll can only be unlocked and ready to be operated if all the safety parameters related to an operation of the power tool indicate a safe usage.

According to an advantageous embodiment of the present invention it is possible that the main detector comprises a wireless module configured to transmit information to a master control unit of the power tool. Thereby, wiring within the power tool can be reduced, in order to make the power tool less complicated and less expensive to manufacture.

According to another advantageous embodiment of the present invention it is possible that the main detector is configured to transmit an activation signal to the master control unit of the power tool to unlock the power tool for operation. This serves as a safety feature that the power tool will only be functional after master control receives an activation signal send by the main detector.

According to another advantageous embodiment of the present invention it is possible that the automatic safety system comprises interface circuitry configured to transmit information from the one or more sensors to the main detector. This ensures that the power tool can only be activated after at least one sensor has sent a signal.

According to another advantageous embodiment of the present invention it is possible that the one or more sensors comprises a safety handle sensor, and wherein the main detector is configured to receive data from the safety handle sensor to determine if a side handle of the power tool is properly installed. Hereby, the power tool can only activated in a safe way if a side handle has be installed properly. It is possible that the power tool is embodied as an angle grinder.

According to another advantageous embodiment of the present invention it is possible that the one or more sensors comprises a guard detection sensor, and wherein the main detector is configured to receive data from the guard detection sensor to determine if a protection guard of the power tool is properly installed. Hereby, the power tool can only activated in a safe way if a guard has be installed properly. It is possible that the power tool is embodied as an angle grinder.

According to another advantageous embodiment of the present invention it is possible that the one or more sensors comprises a tool detection sensor, and wherein the main detector is configured to receive data from the tool detection sensor to determine if a tool of the power tool is properly installed. Hereby, the power tool can only activated in a safe way if a tool has be installed properly. It is possible that the power tool is embodied as an angle grinder.

According to another advantageous embodiment of the present invention it is possible that the one or more sensors comprises a dust hood detection sensor, and wherein the main detector is configured to receive data from the dust hoot detection sensor to determine if a dust hood of the power tool is properly installed. Hereby, the power tool can only activated in a safe way if a dust hood has be installed properly. It is possible that the power tool is embodied as an angle grinder.

According to another advantageous embodiment of the present invention it is possible that the one or more sensors comprises a touch sensor, a position/orientation sensor, a force sensor, or a combination thereof. Hereby, the power tool can only activated in a safe way if the power tool is held in a correct manner, i.e. the operator of the power tool is applying a firm hand grip to the designated sections (e.g. handle) of the power tool.

Beyond that, the above described problem is also solved by a method for controlling a power tool.

According to the invention, the method comprises the steps receiving, via a main detector, one or more signals from one or more sensors disposed about the power tool, wherein the one or more sensors are configured to gather data about a safety parameter related to an operation of a power tool;

determining, via the main detector, whether to unlock the power tool for operation based on the data received from the one or more sensors; and sending an activation signal to a control unit of the power tool, via the main detector, to unlock the power tool for operation.

By doing so, the power toll can only be unlocked and ready to be operated if all the safety parameters related to an operation of the power tool indicate a safe usage.

According to an advantageous embodiment of the present invention it is possible that the power tool is an angle grinder utilized on a construction site.

According to another advantageous embodiment of the present invention it is possible that determining whether to unlock the power tool comprises determining if a safety handle of the power tool is properly installed. Hereby, the power tool can only activated in a safe way if a safety handle has be installed properly. It is possible that the power tool is embodied as an angle grinder.

According to another advantageous embodiment of the present invention it is possible that determining whether to unlock the power tool comprises determining if a protection guard of the power tool is properly installed. Hereby, the power tool can only activated in a safe way if a protection guard has be installed properly. It is possible that the power tool is embodied as an angle grinder.

According to another advantageous embodiment of the present invention it is possible that determining whether to unlock the power tool comprises determining if the power tool is properly held and oriented by an operator.

According to another advantageous embodiment of the present invention it is possible that determining whether to unlock the power tool comprises determining if a tool of the power tool is properly installed or if a dust hood of the power tool is properly installed. Hereby, the power tool can only activated in a safe way if a tool or dust hood has be installed properly. It is possible that the power tool is embodied as an angle grinder.

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment of the present invention, a system includes an angle grinder and an automatic safety system communicatively coupled to the angle grinder. The automatic safety system includes one or more sensors disposed about the angle grinder, where the one or more sensors are configured to gather data about a safety parameter related to an operation of the angle grinder. The automatic safety system also includes a main detector configured to receive the data gathered by the one or more sensors. The main detector is configured to analyze the received data to determine whether to unlock the angle grinder for operation.

In another embodiment of the present invention, a method is provided. The method includes receiving, via a main detector, one or more signals from one or more sensors disposed about the angle grinder, where the one or more sensors are configured to gather data about a safety parameter related to an operation of a power tool. The method also includes determining, via the main detector, whether to unlock the power tool for operation based on the data received from the one or more sensors. The method also includes sending an activation signal to a control unit of the power tool, via the main detector, to unlock the power tool for operation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Present embodiments are directed to safety features that are built into the operating features of a power tool, such as an angle grinder. Specifically, the present embodiments generally relate to a safety protocol that is automatically executed by the angle grinder prior to use. In particular, as noted above, the safety protocol may be beneficial in improving operator safety and in helping an operator maintain control over the angle grinder. For example, in certain situations, if a side handle of the angle grinder is improperly installed, an operator may lose control of the angle grinder during a kickback situation. As a further example, if a protection guard is improperly installed, the operator may be injured by hot sparks during operation of the angle grinder. In certain situations, an operator may unintentionally forget to manually perform safety checks prior to operating the angle grinder. In other situations, it may be inefficient and cumbersome for an operator to perform safety checks prior to each use of the angle grinder. Accordingly, there is a need for an automatic safety protocol that will determine whether certain accessories of the angle grinder are properly installed and/or whether the angle grinder is generally safe to operate.

In certain embodiments, the safety protocol may be a series of safety checks that detect the status of one or more operating or safety parameters of the angle grinder. Once the angle grinder executes and passes each safety check of the protocol, the angle grinder may be configured for operation. In certain embodiments, the safety checks include determining whether the safety side handle is properly installed and held, whether the protection guard is properly installed, and whether the angle grinder is properly positioned and oriented (e.g., held properly by the operator). In certain embodiments, the safety checks include determining whether a proper disc accessory is selected and installed and/or whether a dust hood is properly installed. It should be noted that while one or more safety features are described with respect to the safety protocol of the present embodiments, the listed safety features are not limiting or cumulative. Indeed, in other embodiments of the safety protocol, other safety features that are of interest to operation of an angle grinder may be incorporated into the safety protocol. In this manner, the safety protocol may be automatically executed to perform one or more series of desired safety checks for a power tool, such as an angle grinder.

Figure 1:
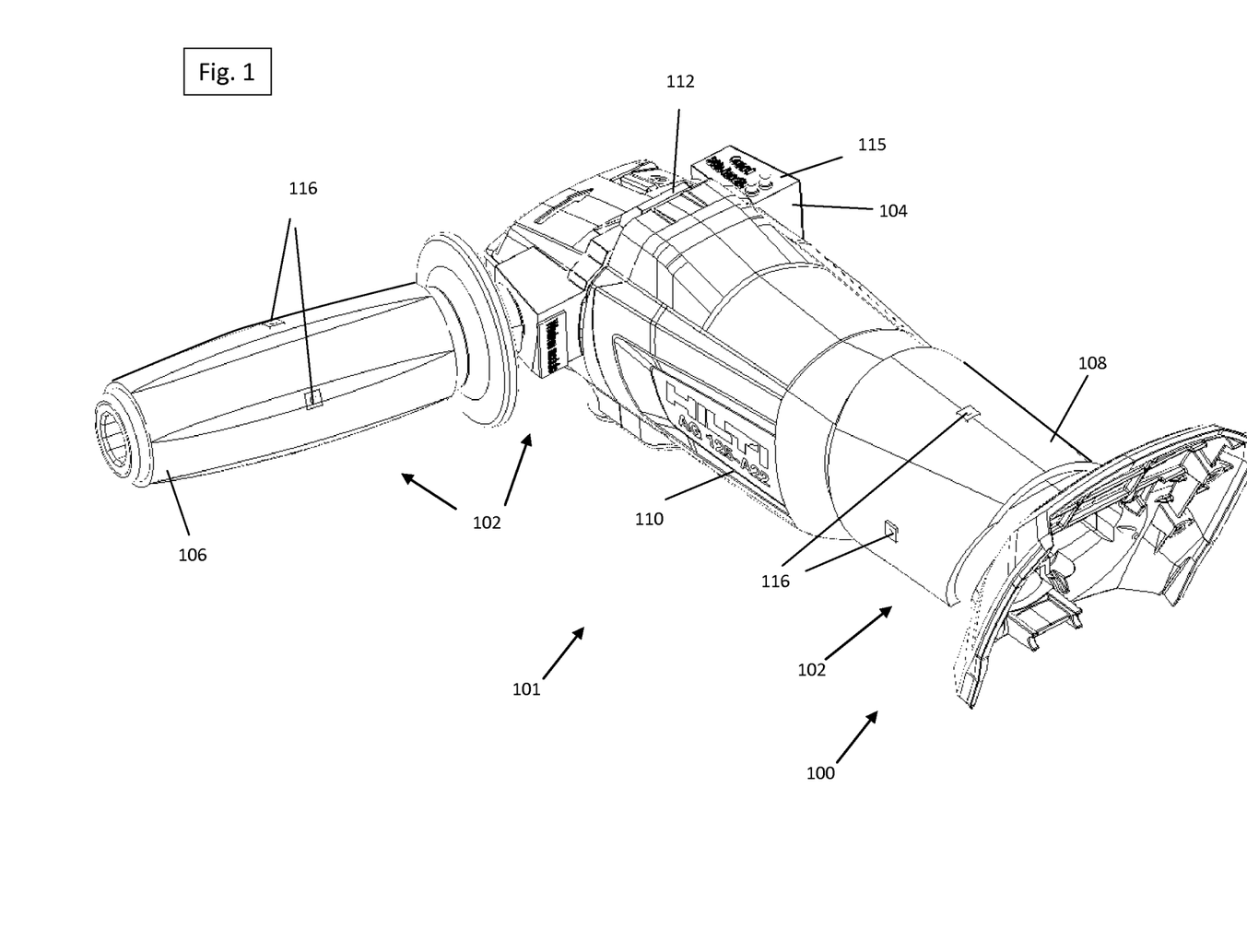
FIG. 1 is a perspective view of an embodiment of an angle grinder, having an automatic safety system communicatively coupled to the angle grinder, in accordance with aspects of the present embodiments.
Figure 2:
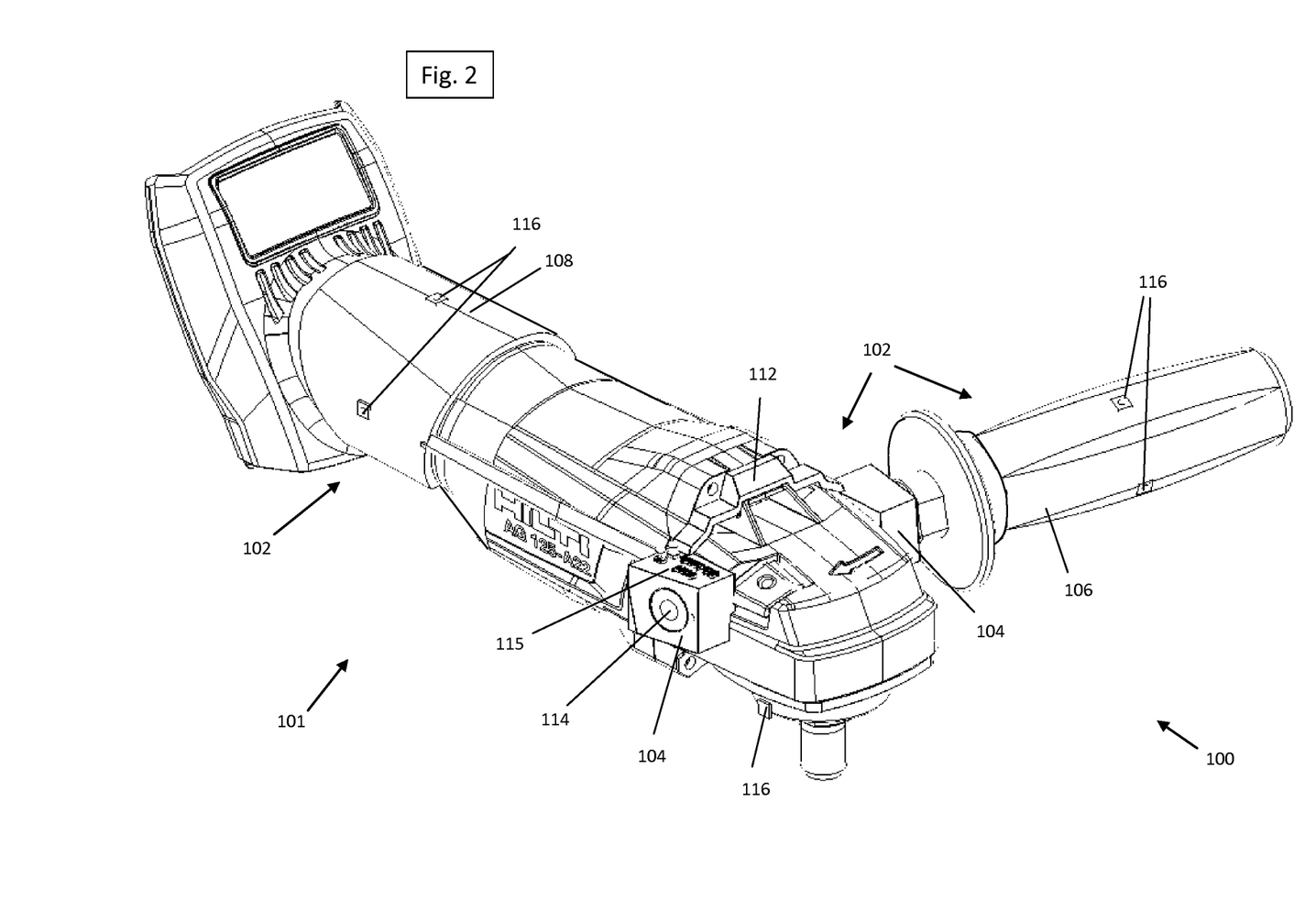
FIG. 2 is a perspective view of the embodiment of the angle grinder of FIG. 1, in accordance with aspects of the present embodiments.

With the foregoing in mind, FIGS. 1 and 2 are perspective views of an embodiment a system 100 comprising a power tool 101 and an automatic safety system 102 communicatively coupled to the power tool. The power tool 101 is embodied as an angle grinder. In the illustrated embodiment, the angle grinder 101 includes an automatic safety system 102 communicatively coupled to the angle grinder 101. In certain embodiments, the automatic safety system 102 includes a main detector 104, a side handle 106, and a body sleeve 108. As further described with respect to FIGS. 3-5, the automatic safety system 102 is configured to execute an automated safety protocol with one or more safety checks. In particular, after successful completion of the automated safety protocol, the automatic safety system 102 may be configured to send an activation signal to the control unit of the angle grinder 101. The activation signal provided to the control unit of the angle grinder 101 allows the angle grinder 101 to be engaged for operation.

In certain embodiments, the angle grinder 101 includes a gear housing, a disc holder, a disc accessory configured to couple to the disc holder. The gear housing and the disc accessory are not shown in the figures.

Figure 5:
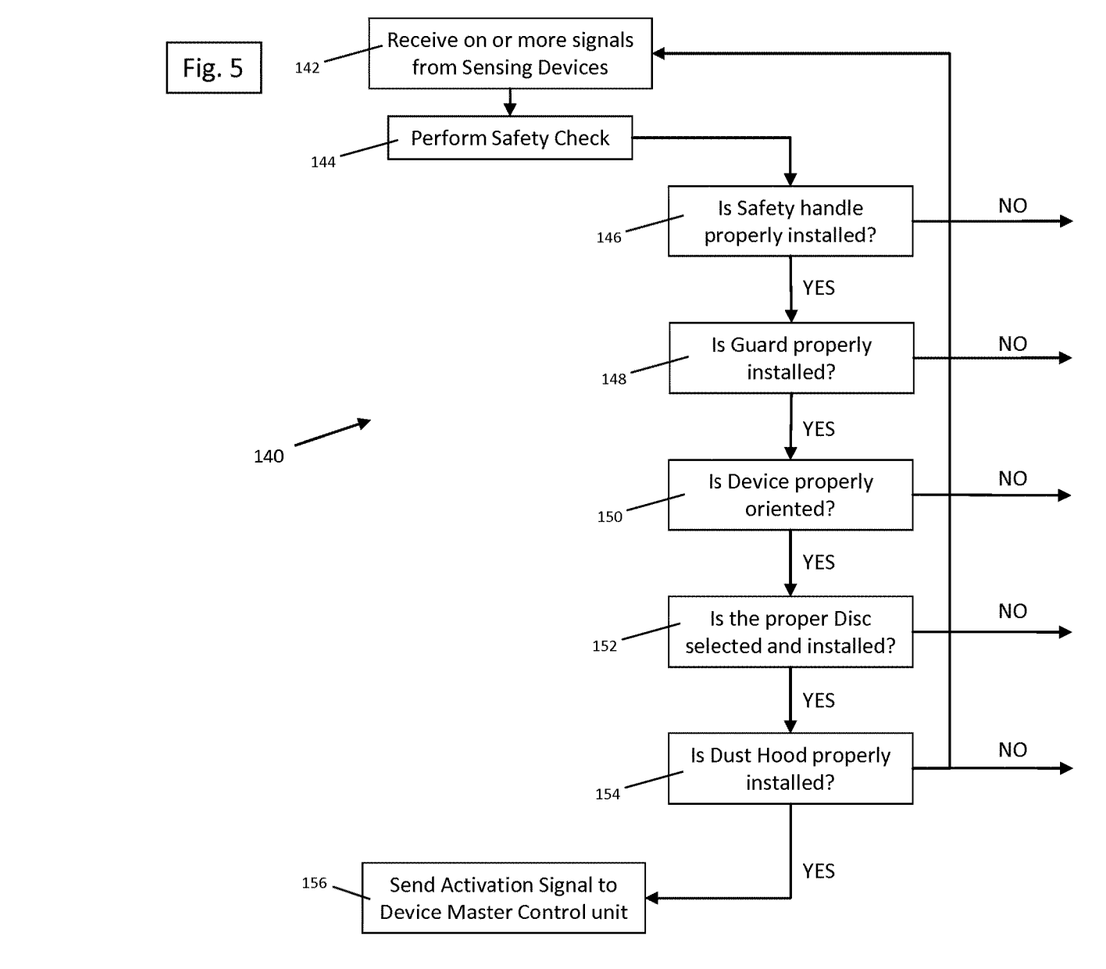
FIG. 5 is an embodiment of a process for executing a safety protocol for the angle grinder of FIG. 1, where the safety protocol is executed prior to activating the angle grinder for operation, in accordance with aspects of the present embodiments.

In particular, the gear housing includes a control unit configured to receive one or more activation signals from the automatic safety system 102, as further explained with respect to FIG. 5. The control unit is not shown in the figures. The control unit may be configured to unlock the angle grinder 101, so that the operator is allowed to engage the angle grinder 101 by pushing the "START" or "ON" button. In certain embodiments, such as when the angle grinder 101 fails to successfully pass each safety check of the automatic safety protocol, the control unit may not receive any activation signals from the automatic safety system 102, and the angle grinder 101 will remain in a safety lock position. In the safety lock position, the angle grinder 101 may be inoperable when the operator pushes the "START" or "ON" button. Accordingly, in this manner, the angle grinder 101 may be configured to reduce the likelihood of an accidental start and/or operation of the angle grinder 101 prior to a safety check of one or more components.

In certain embodiments, the automatic safety system 102 may be coupled to the body 110 of the angle grinder 101. In particular, the automatic safety system 102 includes a body sleeve 108 that is configured to conform to the external shape of the body 110. For example, the body sleeve 108 may be configured to wrap around a portion of the body 110, thereby securing the automatic safety system 102 to the angle grinder 101. In certain embodiments, the side handle 106 may be coupled to the main detector 102 of the automatic safety system 102, as further described with respect to FIG. 3. In certain embodiments, the main detector 102 may include an extension 112 that is configured to couple two sides of the main detector 102. Further, each side of the main detector 102 may include an attachment 114 (shown in FIG. 3) that secure the main detector 102 around the body 110 of the angle grinder 101. In certain embodiments, the extension 112 may be conformed to fit the external surfaces of the body 110 and/or may be configured to fit into a groove of the external surface of the body 100. In certain embodiments, the attachment 114 may additionally couple the side handle 106 to the main detector 102.

In certain embodiments, a user interface 115 may be disposed on the main detector 104, and include one or more visual indicia configured to provide information to an operator regarding the status of one or more safety or operating parameters. In certain embodiments, the user interface 115 may include one or more LEDs indicators of one or more different colors, such that each color identifies a status of a different feature or component. For example, in certain embodiments, an LED light and color may be utilized to indicate whether a protection guard is installed properly. Likewise, in certain embodiments, an LED light may be utilized to indicate whether the side handle 106 is installed properly. Similarly, in other embodiments, other types of visual indicia, (e.g., text, pictures, patterns of light, alerts, etc.) may be utilized to indicate information to the operator. In certain embodiments, a graphics display may be utilized to display safety and/or operating features derived from the safety protocol executed by the automatic safety system 100. In certain embodiments, additional information, such as status of wireless communication, may be displayed and/or communicated to an operator via the user interface 115.

Figure 3:
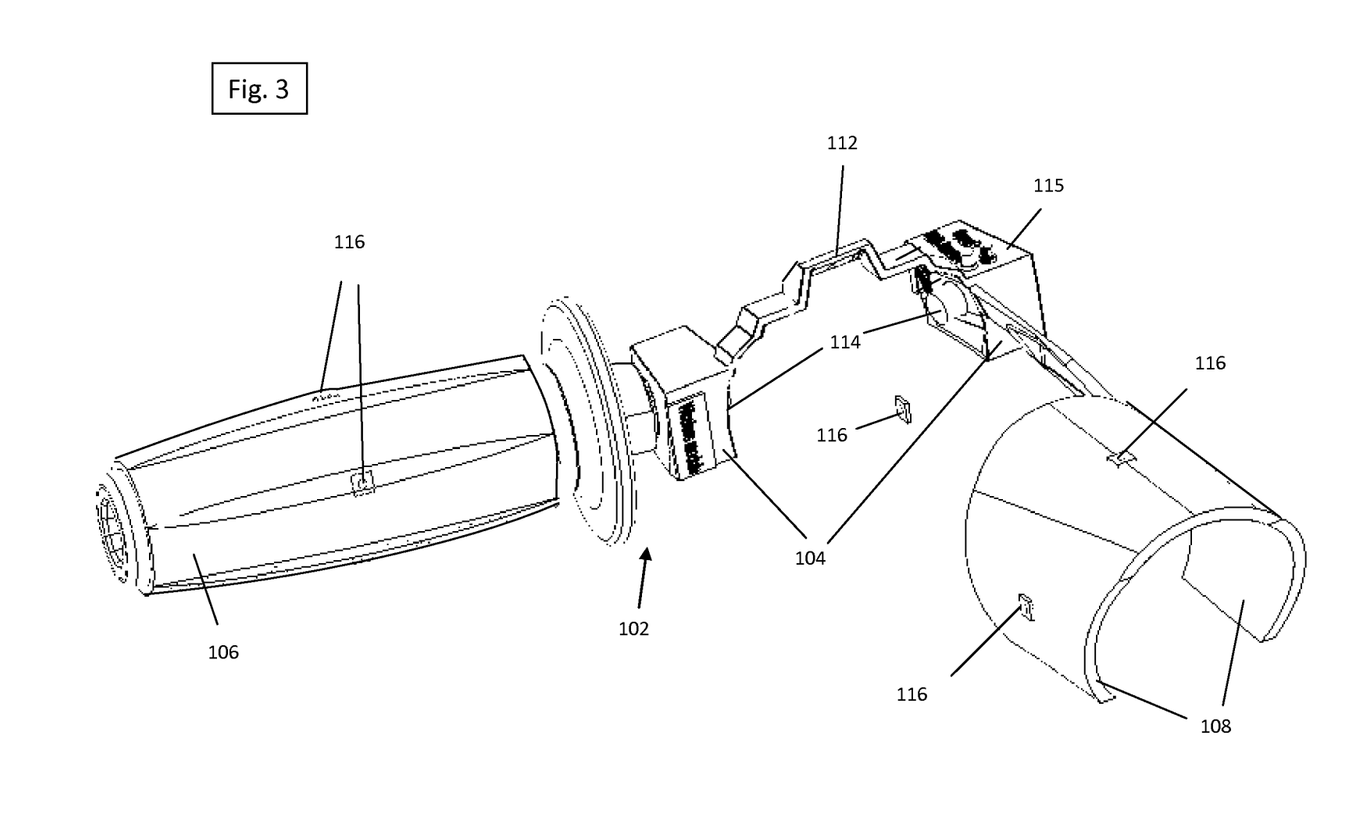
FIG. 3 is a perspective view of an embodiment of the automatic safety system of FIG. 1, having a main detector, a safety handle, and a body sleeve, in accordance with aspects of the present embodiments.

FIG. 3 is a perspective view of an embodiment of the automatic safety system 100 of FIG. 1, having the main detector 104, the safety handle 106, and the body sleeve 108, in accordance with aspects of the present embodiments. Further, the illustrated embodiment depicts one or more sensors 116 (or sensing devices 116) disposed on the automatic safety system 100 and configured to gather safety and operating information related to the angle grinder 101.

In certain embodiments, the one or more sensing devices 116 or sensors 116 may be configured throughout the angle grinder 101. In certain embodiments, the sensors 116 may be configured for a specific function and may be located in a specific location. For example, a side handle detection sensor (or switch) may be located proximate to the connection between the side handle 106 and the main detector 104, and may be configured to provide a status signal regarding the position and depth of the side handle 106. Specifically, the sensor 116 may be positioned proximate to the attachments 114, and the sensor 116 may be configured to determine the depth or position to which the side handle 106 is installed with respect to the attachment 114. The signal information related to the position and depth of the side handle 106 may be utilized to determine whether the side handle 106 is properly installed. As a further example, a guard detection sensor (or switch) may be located proximate to the protection guard, and may be configured to provide a status signal regarding whether the protection guard was properly installed.

In certain embodiments, the sensors 116 may be configured to gather other types of information, such as information related to the dust hood and/or the disc selection. For example, the sensor 116 may be a touch sensor (e.g., membrane switch or other kind of thin layer sensor) that is attached near the installation interface to detect the dust hood. When the dust hood is installed, the sensor 116 may be turned on by physical contact, and a signal may be sent to the controller of the main detector to indicate that the dust hood is installed. Similarly, the sensor 116 may be a touch sensor (e.g., membrane switch or other kind of thin layer sensor) that is attached near the gear housing to detect the disc. When the protection guard is installed, the sensor 116 may be turned on by physical contact, and a signal may be sent to the controller 122 of the main detector 104 indicating the disc is installed.

In certain embodiments, the sensors may be position/orientation sensors, and may be disposed in locations where an orientation or position of the angle grinder 101 is needed. For example, in certain embodiments, one or more sensors may be disposed on the side handle 106, and may be configured to determine whether the side handle 106 is properly held or positioned by an operator. Similarly, position/orientation sensors may be disposed on the body 110 or the body sleeve 108 to determine the same. In certain embodiments, the sensors 116 may be pressure sensors that detect whether an operator is in physical contact with the angle grinder 101 in appropriate locations. Indeed, any type of sensor (e.g., accelerometers, temperature sensors, proximity and displacement sensors, image sensors, touch sensors, level sensors, gyroscopes, force, or speed sensors, etc.) may be utilized to gather safety and/or operating parameter information related to the angle grinder 101. Specifically, as further discussed with respect to FIGS. 4 and 5, the sensors may be triggered based on an automatic safety protocol executed by the main detector 104 of the automatic safety system 100. Further, as described with respect to FIGS. 4 and 5, based on the information received, the automatic safety system 100 may be configured to send an activation signal to the control unit of the angle grinder 101.

In certain embodiments, interface circuitry 120 (e.g., wires) may be provided through the automatic safety system 100 to communicatively couple the sensors 116 with the main detector 104. For example, one or more wires may extend between the body sleeve 108 and the main detector 104, between the side handle 106 and the main detector 104, as well as through the extension 112 of the main detector 104.

Figure 4:
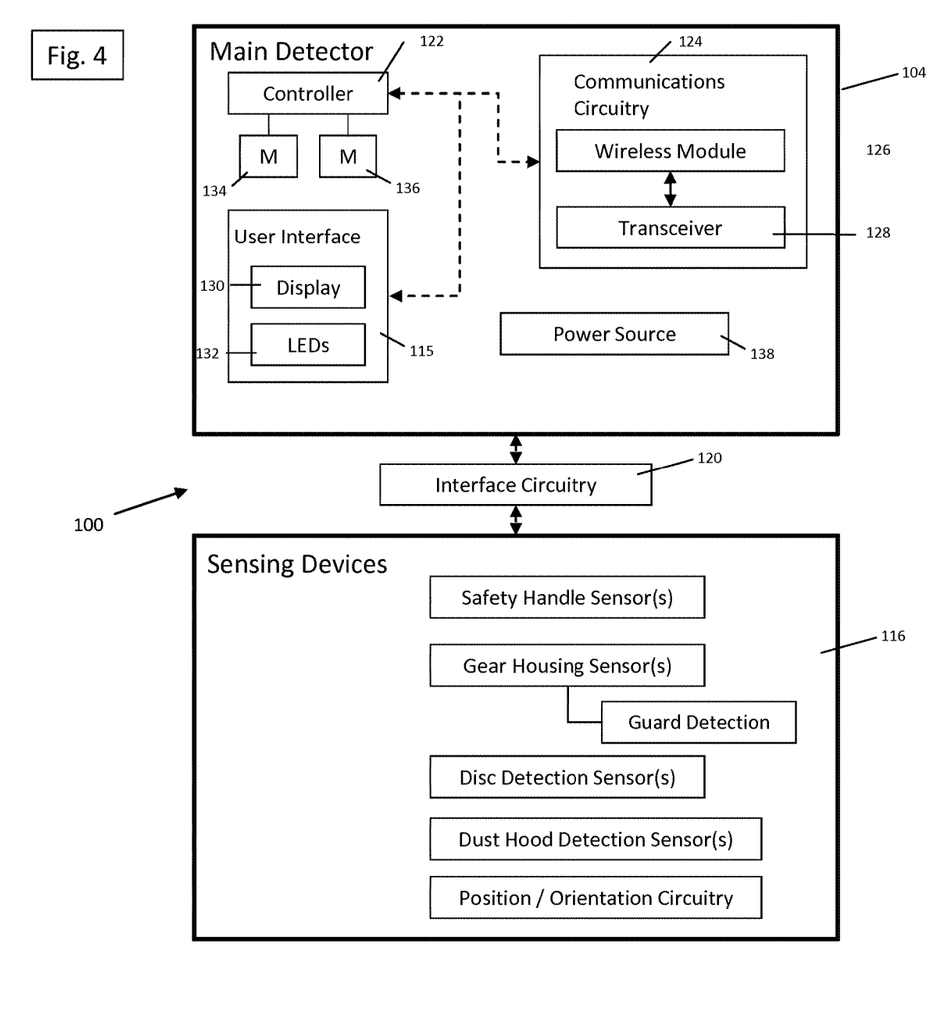
FIG. 4 is a schematic view of an embodiment of the automatic safety system of FIG. 1, illustrating a controller configured to interface with one or more sensing devices of the angle grinder, in accordance with aspects of the present embodiments.

FIG. 4 is a schematic view of an embodiment of the automatic safety system 100 of FIG. 1, illustrating the main detector 104 having a controller 122 configured to interface (via the interface circuitry 120) with one or more sensing devices 116 of the angle grinder 101. In certain embodiments, the main detector 104 may include communications circuitry 124 having a wireless module 126 and a transceiver 128. As noted above, the user interface 115 may include (optionally) a display 130 and one or more LEDS 132.

In certain embodiments, the controller 122 may be communicatively coupled to a processor 134 and a memory 136. The processor 134 may be configured to execute instructions stored on the memory 136 to carry out the automatic safety protocol operations of the automatic safety system 100. The memory 136 may be configured to store instructions that are loadable and executable on the processor 134. In certain embodiments, the memory 136 may be volatile (such as random access memory (RAM)) and/or non-volatile (such as read-only memory (ROM), flash memory, etc.). The controller 122 may also include additional removable storage and/or non-removable storage including, but not limited to, magnetic storage, optical disks, and/or tape storage. In some implementations, the memory 136 may include multiple different types of memory, such as static random access memory (SRAM), dynamic random access memory (DRAM), or ROM.

In particular, the controller 122 may be configured to execute instructions that carry out the automatic safety protocol operations, and may be configured to receive data/information from the one or more sensors 116. For example, when triggered, the automatic safety protocol may conduct a series of safety checks throughout the angle grinder 101, as further described with respect to FIG. 5. Each safety check may be an executable instruction that is configured to check the safety or operability status of a component or a feature of the angle grinder 101. In certain embodiments, the sensors 116 may be configured to automatically provide data or information to the controller 122. In certain embodiments, an operator can initiate the safety protocol by pressing a button or indicating a command through the user interface 115 of the angle grinder 101. In response to each safety check, a sensor 116 may be configured to provide a detection signal regarding a status (information/data) of the component or feature to the controller 122. Based on the received information, the controller 122 may be configured to determine whether the angle grinder 101 passed the safety check or failed the safety check. Once all of the safety checks (or a desired number or a desired type of safety checks) are positively passed, the controller 122 may be configured to send an activation signal to the control unit of the angle grinder 101.

In certain embodiments, the main detector 104 may include a power source 138. The power source 138 may be a replaceable and/or rechargeable power source (e.g., battery powered) disposed within the main detector 104. In certain embodiments, the main detector 104 may be powered by a power source disposed within the side handle 106, or may be powered via an external power source.

In certain embodiments, the main detector 104 may include communications circuitry 124 having a wireless module 126 and/or a transceiver 128. In certain embodiments, the main detector 104 may be configured to transmit the information gathered by the sensors 116 to the control unit of the angle grinder 101. In such embodiments, the main detector 104 may or may not include a controller 122, processor 134, and/or a memory 136 to execute and/or process information. In other embodiments, the main detector 104 may be configured to receive and analyze the information received from the sensors 116 to determine whether the angle grinder 101 is ready to be operated. In either embodiment, the wireless module may be utilized to transmit data and/or the activation signal to the main control of the angle grinder 101. In certain embodiments, the wireless module 126 and/or the transceiver 128 may be incorporated in the control unit of the angle grinder 101.

FIG. 5 is an embodiment of a process 140 for executing an automatic safety protocol for the angle grinder 101 of FIG. 1, where the automatic safety protocol is executed prior to activating the angle grinder 101 for operation. In the illustrated embodiment, one or more steps of the process 140 may be executable by the controller 122 of the main detector 104 and/or by a master control unit of the angle grinder 101. Master control unit is not shown in the figures. In certain embodiments, the process 140 includes receiving one or more signals from the sensor 116 (block 142) and performing a series of safety checks on the angle grinder 101 (block 144). Specifically, in certain embodiments, the process 140 includes determining if the safety handle is properly installed (block 146), determining if the guard is properly installed (block 148), and/or determining if the device is properly oriented (block 150) (e.g., determining if the side handle 106 and/or the body sleeve 108 and/or the body 110 is properly held and/or positioned). In certain embodiments, the process 140 includes determining if the proper disc is selected and/or installed (block 152), and/or determining if dust hood is properly installed (block 154). If the signals received from the sensors 116 indicate that the safety features are in alignment with the desired status, the process 140 is configured to send an activation signal to the master control unit of the angle grinder 101. In certain embodiments, the activation signal is configured to unlock the angle grinder 101, so that the operator may engage the angle grinder 101 for use.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    A power tool having a main body; and
    an automatic safety system communicatively coupled to the power tool including at least one sensor disposed about the power tool, wherein the at least one sensor is configured to gather data about a safety parameter related to an operation of the power tool in response to a controller executing instructions to carry out a safety protocol; and a main detector configured to receive the data gathered by the at least one sensor, wherein the main detector is configured to analyze the received data to determine whether to unlock the power tool for operation and transmit an activation signal to a master control unit of the power tool to unlock the power tool, the main detector including at least one attachment securing the main detector around the main body.

2. The system as recited in claim 1 wherein the main detector includes a wireless module configured to transmit information to the master control unit of the power tool.

3. The system as recited in claim 1 wherein the automatic safety system includes interface circuitry configured to transmit information from the at least one sensor to the main detector.

4. The system as recited in claim 1 wherein the at least one sensor includes a safety handle sensor, and wherein the main detector is configured to receive data from the safety handle sensor to determine if a side handle of the power tool is properly installed.

5. The system as recited in claim 1 wherein the at least one sensor includes a guard detection sensor, and wherein the main detector is configured to receive data from the guard detection sensor to determine if a protection guard of the power tool is properly installed.

6. The system as recited in claim 1 wherein the at least one sensor includes a tool detection sensor, and wherein the main detector is configured to receive data from the tool detection sensor to determine if a tool of the power tool is properly installed.

7. The system as recited in claim 1 wherein the at least one sensor includes a dust hood detection sensor, and wherein the main detector is configured to receive data from the dust hoot detection sensor to determine if a dust hood of the power tool is properly installed.

8. The system as recited in claim 1 wherein the at least one sensor includes a touch sensor, a position/orientation sensor, a force sensor, or a combination thereof.

9. The system as recited in claim 1 wherein the main detector includes communications circuitry having a wireless module and a transceiver.

10. The system as recited in claim 1 wherein the main detector has two sides facing the main body and the at least one attachment includes two attachments, one on each side.

11. The system as recited in claim 10 wherein the main detector has an extension connecting the two sides.

12. The system as recited in claim 11 wherein the extension has a shape conforming to fit an external surface of the main body.

13. The system as recited in claim 1 wherein the at least one attachment couples a side handle to the main detector.

14. The system as recited in claim 13 wherein the automatic safety system includes the side handle and a body sleeve fitting over the main body.

15. The system as recited in claim 14 wherein the main detector has two sides facing the main body and the at least one attachment includes two attachments, one on each side and the main detector has an extension connecting the two sides, the side handle being connected to one of the two sides and the body sleeve being connected to the other of the two sides so that the body sleeve and the side handle are spaced apart by the extension.

16. The system as recited in claim 15 wherein the at least one sensor includes a plurality of sensors on the side handle and a plurality of sensors on the body sleeve.

17. A method for controlling a power tool having a main body,
    the method comprising:
    attaching a main detector, via at least one attachment, around the main body;
    receiving, via the main detector, at least one signal from at least one sensor disposed about the power tool, wherein the at least one sensor is configured to gather data about a safety parameter related to an operation of a power tool in response to a controller executing instructions to carry out a safety protocol;
    determining, via the main detector, whether to unlock the power tool for operation based on the data received from the at least one sensor; and
    sending an activation signal to a control unit of the power tool, via the main detector, to unlock the power tool for operation.

18. The method as recited in claim 17 wherein the power tool is an angle grinder utilized on a construction site.

19. The method as recited in claim 17 wherein the determining whether to unlock the power tool includes determining if a safety handle of the power tool is properly installed.

20. The method as recited in claim 17 wherein the determining whether to unlock the power tool includes determining if a protection guard of the power tool is properly installed.

21. The method as recited in claim 17 wherein the determining whether to unlock the power tool includes determining if the power tool is properly held and oriented by an operator.

22. The method as recited in claim 17 wherein the determining whether to unlock the power tool includes determining if a tool of the power tool is properly installed or if a dust hood of the power tool is properly installed.

23. The method as recited in claim 17 wherein the main detector includes communications circuitry having a wireless module and a transceiver.

24. The method as recited in claim 23 wherein the wireless module is used to send the activation signal.

25. A system comprising:
A power tool having a main body; and
an automatic safety system communicatively coupled to the power tool including at least one sensor disposed about the power tool, wherein the at least one sensor is configured to gather data about a safety parameter related to an operation of the power tool; and
the automatic safety system including a main detector configured to receive the data gathered by the at least one sensor, wherein the main detector is configured to analyze the received data to determine whether to unlock the power tool for operation, the main detector including a wireless module and a transceiver configured to transmit the data to a master control of the power tool and send an activation signal via the wireless module and the transceiver to the master control unit, the main detector including at least one attachment securing the main detector around the main body.

* * * * *